(12) United States Patent
Danskin et al.

(10) Patent No.: US 7,979,683 B1
(45) Date of Patent: Jul. 12, 2011

(54) MULTIPLE SIMULTANEOUS CONTEXT ARCHITECTURE

(75) Inventors: John M. Danskin, Providence, RI (US); John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 262 days.

(21) Appl. No.: 11/696,928

(22) Filed: Apr. 5, 2007

(51) Int. Cl.
*G06F 9/40* (2006.01)
(52) U.S. Cl. ........................................ 712/226
(58) Field of Classification Search .................. 712/226, 712/228; 718/108; 719/323
See application file for complete search history.

(56) References Cited

U.S. PATENT DOCUMENTS

| | | | | |
|---|---|---|---|---|
| 6,553,479 | B2 * | 4/2003 | Mirsky et al. ................... | 712/16 |
| 7,209,996 | B2 * | 4/2007 | Kohn et al. ................... | 710/305 |
| 7,240,160 | B1 * | 7/2007 | Hetherington et al. ....... | 711/122 |
| 7,251,815 | B2 * | 7/2007 | Donovan et al. ............. | 718/105 |
| 7,376,954 | B2 * | 5/2008 | Kissell ........................... | 718/107 |
| 7,389,403 | B1 | 6/2008 | Alpert et al. | |
| 7,509,646 | B1 * | 3/2009 | Maw et al. ..................... | 718/105 |
| 2003/0164823 | A1 | 9/2003 | Baldwin et al. | |
| 2005/0125629 | A1 * | 6/2005 | Kissell .............................. | 712/1 |
| 2005/0273571 | A1 * | 12/2005 | Lyon et al. .................... | 711/203 |
| 2006/0248317 | A1 | 11/2006 | Vorbach et al. | |

OTHER PUBLICATIONS

Eggers, et al. "Simultaneous Multithreading: A Platform for Next-Generation Processors," *IEEE Micro*, vol. 17, No. 5, pp. 12-19, Sept./Oct. 1997.
Office Action, U.S. Appl. No. 11/763,371, dated Sep. 3, 2009.
Office Action, U.S. Appl. No. 11/763,371 dated Dec. 21, 2010.

* cited by examiner

*Primary Examiner* — Eric Coleman
(74) *Attorney, Agent, or Firm* — Patterson & Sheridan, LLP

(57) ABSTRACT

Graphics processing elements are capable of processing multiple contexts simultaneously, reducing the need to perform time consuming context switches compared with processing a single context at a time. Processing elements of a graphics processing pipeline may be configured to support all of the multiple contexts or only a portion of the multiple contexts. Each processing element may be allocated to process a particular context or a portion of the multiple contexts in order to simultaneously process more than one context. The allocation of processing elements to the multiple contexts may be determined dynamically in order to improve graphics processing throughput.

20 Claims, 7 Drawing Sheets

MULTIPLE SIMULTANEOUS CONTEXT ARCHITECTURE

BACKGROUND OF THE INVENTION

1. Field of the Invention

The present invention generally relates to graphics data processing and more specifically to processing multiple graphics contexts simultaneously and allocating graphics processing units among the multiple graphics contexts.

2. Description of the Related Art

Current graphics processing systems maintain state information for a single processing context. A processing context consists of a complete set of rendering state through the entire graphics pipeline. Many programs running on a CPU will need only one processing context for all their graphics, although some programs might use multiple processing contexts. For example, a program may use one context for each window or one context for graphics and another context to run computing applications on a graphics processor. As more application programs use the graphics processing system to perform graphics processing, it is necessary to switch between the different contexts that correspond to each application program. As the capabilities of the graphics processing systems have increased, the complexity and execution time for the graphics processing programs has also increased. Therefore, the amount of active state information that is maintained within the graphics processing system has also increased.

In order to complete a context switch, the active state information is saved in memory and new state for a different context is loaded into the graphics processing system and processing is resumed using the new state. The time needed to unload and load the active state information reduces the processing throughput since the graphics processing system is unavailable during the unloading and loading operations. In some cases, the unloading and loading operation may take as long as 500 microseconds. When each context requires a small amount of graphics processing, the context switching time may exceed the time spent processing data. Alternatively, the graphics processing pipeline may be drained to idle the pipeline, so that the size of the active state information is minimized. However, some graphic pipelines may be very deep, i.e., have a high latency, and require too long to drain, necessitating a costly active context switch to change to a different context without draining the pipeline.

Accordingly, what is needed in the art is a system and method for improving processing throughput when multiple graphics contexts are processed.

SUMMARY OF THE INVENTION

Graphics processing elements within a graphics processing system are capable of processing multiple contexts simultaneously, reducing the need to perform time consuming context switches compared to processing multiple contexts serially. Processing elements of a graphics processing pipeline may be configured to support all of the multiple contexts or only a portion of the multiple contexts. Each processing element may be allocated to process a particular context or a portion of the multiple contexts in order to simultaneously process more than one context. The allocation of processing elements to the multiple contexts may be determined dynamically in order to improve graphics processing throughput.

Various embodiments of a method of the invention for simultaneously processing multiple contexts include allocating a portion of context processing elements to each one of the multiple contexts to produce a processing allocation and configuring context processing elements to process the multiple contexts based on the allocation. A first context processing element of the context processing elements is configured to process a first set of contexts including one or more of the multiple contexts based on the allocation. A second context processing element of the context processing elements is configured to process a second set of contexts including one or more of the multiple contexts based on the allocation. Data for two or more of the multiple contexts is simultaneously processed within the first context processing element and the second context processing element to produce processed data for the first set of contexts and the second set of contexts.

Various embodiments of the invention for simultaneously processing multiple contexts include a parallel processing unit configured to simultaneously process the multiple contexts using a processing allocation that specifies a number of context processing elements that is dedicated to process each one of the multiple contexts. The parallel processing unit includes a work distribution unit, a first context processing element, and a second context processing element. The work distribution unit is configured to receive instructions and data for the multiple contexts and distribute the instructions and data to multiple context processing elements according to the processing allocation. The first context processing element is configured to process a first set of contexts including one or more of the multiple contexts based on the allocation to produce processed data for the first set of contexts. The second context processing element is configured to simultaneously process a second set of contexts including one or more of the multiple contexts based on the allocation to produce processed data for the second set of contexts.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
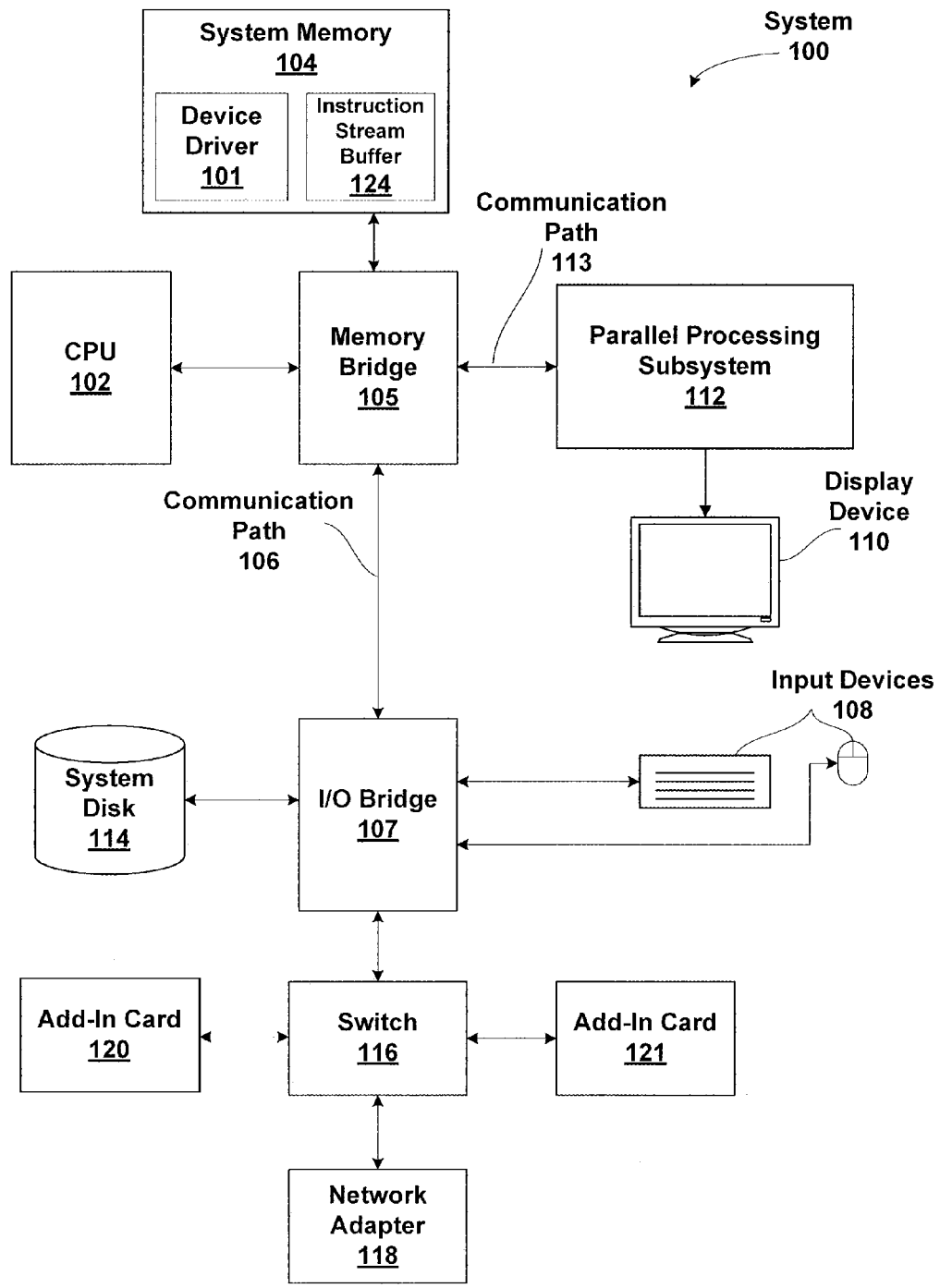
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes a central processing unit (CPU) 102 and a system memory 104 communicating via a bus path that includes a memory bridge 105. System memory 104 includes a device driver 101 that is configured to provide an instruction stream buffer 124 that specifies the location of data and program instructions to parallel processing subsystem 112. The data and program instructions may be stored in system memory 104 or memory within other devices of system 100. Device driver 101 is executed by CPU 102 to translate instructions for execution by parallel processing subsystem 112 based on the specific capabilities of parallel processing subsystem 112. The instructions may be specified by an application programming interface (API) which may be a conventional graphics API such as Direct3D or OpenGL.

Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 2:
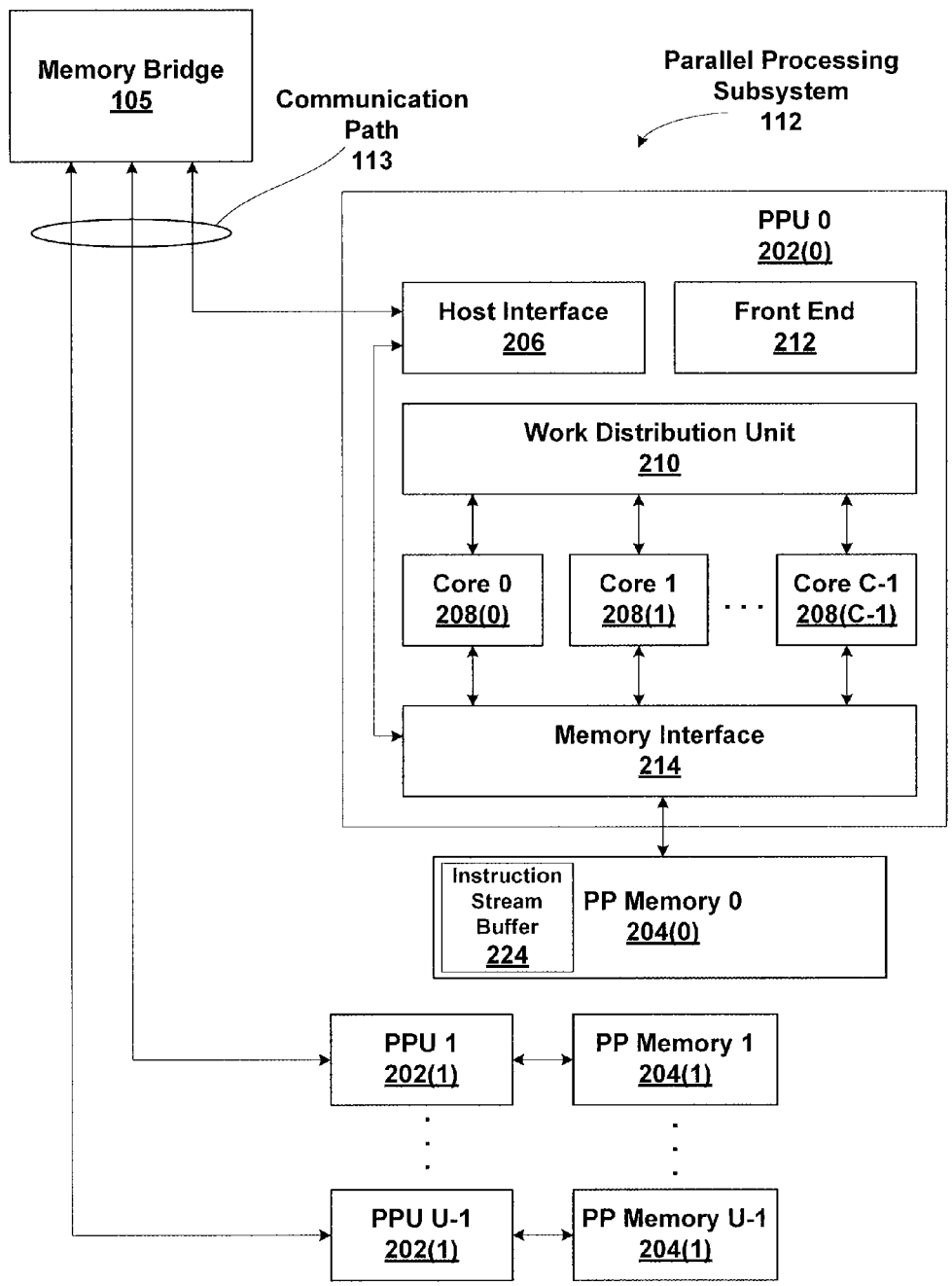
FIG. 2 is a block diagram of a parallel processing subsystem for the computer system of FIG. 1 in accordance with one or more aspects of the present invention.

An embodiment of parallel processing subsystem 112 is shown in FIG. 2. Parallel processing subsystem 112 includes one or more parallel processing units (PPUs) 202, each of which is coupled to a local parallel processing (PP) memory 204. An instruction stream buffer 224 that specifies the location of data and program instructions for execution by each PPU 202 may be stored in each PP memory 204. In general, a parallel processing subsystem includes a number U of PPUs, where u≧1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C≧1. Each processing core 208 is capable of executing a large number (e.g., tens or hundreds) of threads concurrently, where each thread is an instance of a program; one embodiment of a multithreaded processing core 208 is described below. As previously described, a processing context encompasses a complete set of state through PPU 202, while a thread may encompass only the state required to shade a single pixel. Threads run inside processing contexts: one processing context might contain thousands of running threads. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208.

In a conventional system, processing tasks for a single context are executed in parallel and a context switch must occur before processing tasks for another context are received. In contrast, when multiple contexts are used as permitted by the present invention, each processing task may correspond to a different one of the multiple contexts and cores 208 may be configured to process tasks for one or more of the multiple contexts. In some embodiments of the present invention, device driver 101 allocates one or more core(s) 208 for each one of the multiple contexts and work distribution unit 210 distributes the processing tasks according to that allocation.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by instruction stream buffer 124 via memory bridge 105 and bus 113, interacting with local PP memory 204 (which can be used as graphics memory including, e.g., a conventional frame buffer, instruction stream buffer 224, texture maps, and the like) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1) that is specified by instruction stream buffer 124 or 224, and which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU 202 may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory, e.g., via a bridge chip.

As noted above, any number of PPUs 202 can be included in a parallel processing subsystem. For instance, multiple PPUs 202 can be provided on a single add-in card, or multiple add-in cards can be connected to communication path 113, or one or more of the PPUs 202 could be integrated into a bridge chip. The PPUs 202 in a multi-PPU system may be identical to or different from each other; for instance, different PPUs 202 might have different numbers of cores, different amounts of local PP memory, and so on. Where multiple PPUs 202 are present, they may be operated in parallel to process data at higher throughput than is possible with a single PPU 202.

Systems incorporating one or more PPUs 202 may be implemented in a variety of configurations and form factors, including desktop, laptop, or handheld personal computers, servers, workstations, game consoles, embedded systems, and so on.

Core Overview

Figure 3:
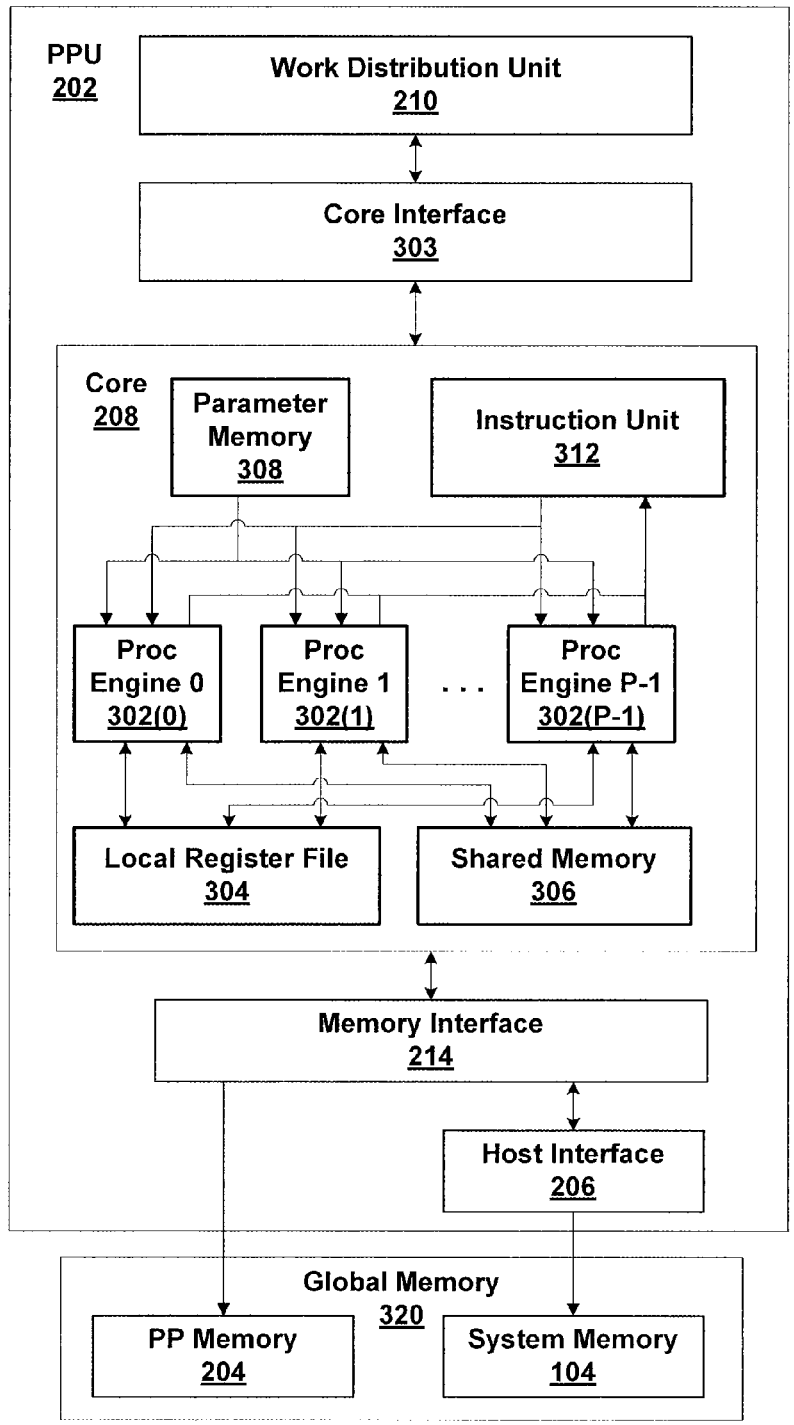
FIG. 3 is a block diagram of a parallel processing unit for the parallel processing subsystem of FIG. 2 in accordance with one or more aspects of the present invention.

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a context, i.e., a particular program executing on a particular set of input data. In some embodiments, single-instruction, multiple-data (SIMD) instruction issue techniques are used to support parallel execution of a large number of threads without providing multiple independent instruction units.

In one embodiment, each core 208 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

When core 208 is configured to process multiple contexts, each processing engine 302 may be allocated to process one or more of the multiple contexts. State information for each context that a processing engine 302 is allocated to process may be stored in local register file 304, shared memory 306, and/or global memory 320 to allow the processing engine 302 to switch between contexts as needed to respond to an allocation change or a context whose processing is blocked. For example, multiple contexts may be processed during multiple cycles, with a single context selected for processing each cycle. In some embodiments of the invention each processing engine 302 is configured to process a single context at a time. In those embodiments, core 208 processes multiple contexts simultaneously since each processing engine 302 may be configured to process a different context. In other embodiments of the present invention, processing engine 302 is configured to process multiple contexts by maintaining active context state for more than one context.

In one embodiment, each processing engine 302 is multithreaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency. Since each thread may correspond to a different context, multiple contexts may be processed over multiple cycles as different threads are issued for each cycle.

Instruction unit 312 is configured such that, for any given processing cycle, an instruction (INSTR) is issued to each P processing engines 302. Each processing engine 302 may receive a different instruction for any given processing cycle when multiple contexts are being processed simultaneously. When all P processing engines 302 process a single context, core 208 implements a P-way SIMD microarchitecture. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads for a single context or N*24 concurrent threads for each context, where N is the number of processing engines 302 allocated to the context.

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new context in instruction unit 312, then signals instruction unit 312 to begin executing the context. When execution of a context is completed, core 208 advantageously notifies core interface 303. Core interface 303 can then initiate other processes, e.g., to retrieve output data from shared memory 306 and/or to prepare core 208 for execution of additional contexts.

It will be appreciated that the core architecture described herein is illustrative and that variations and modifications are possible. Any number of processing engines may be included. In some embodiments, each processing engine 302 has its own local register file, and the allocation of local register file entries per thread can be fixed or configurable as desired. In particular, entries of local register file 304 may be allocated for processing each context. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Thread Arrays and Cooperative Thread Arrays

In some embodiments, multithreaded processing core 208 of FIG. 3 can execute general-purpose computations using thread arrays. As used herein, a "thread array" is a group consisting of a number (n0) of threads that concurrently execute the same program on an input data set to produce an output data set for a context. Each thread in the thread array is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread arrays are "cooperative" thread arrays, or CTAS. As with other types of thread arrays, a CTA is a group of multiple threads that concurrently execute the same program (referred to herein as a "CTA program") on an input data set to produce an output data set for a context. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAS, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread arrays) are advantageously employed to perform computations that lend themselves to data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set. A CTA program can implement algorithms using a wide range of mathematical and logical operations, and the program can include conditional or branching execution paths and direct and/or indirect memory access.

For example, as is known in the art, an array of data values (e.g., pixels) can be filtered using a 2-D kernel-based filter algorithm, in which the filtered value of each pixel is determined based on the pixel and its neighbors. In some instances the filter is separable and can be implemented by computing a first pass along the rows of the array to produce an intermediate array, then computing a second pass along the columns of the intermediate array. In one CTA implementation of a separable 2-D filter, the threads of the CTA load the input data set (or a portion thereof) into shared memory 306, then synchronize. Each thread performs the row-filter for one point of the data set and writes the intermediate result to shared memory 306. After all threads have written their row-filter results to shared memory 306 and have synchronized at that point, each thread performs the column filter for one point of the data set. In the course of performing the column filter, each thread reads the appropriate row-filter results from shared memory 306, and a thread may read row-filter results that were written by any thread of the CTA. The threads write their column-filter results to shared memory 306. The resulting data array can be stored to global memory or retained in shared memory 306 for further processing. Where shared memory 306 can be accessed with lower latency and/or greater bandwidth than global memory, storing intermediate results in shared memory 306 advantageously improves processor throughput.

In one embodiment, a driver program executing on CPU 102 of FIG. 1 writes commands defining the CTA to a pushbuffer (not explicitly shown) in memory (e.g., system memory 104), from which the commands are read by a PPU 202. The commands advantageously are associated with state parameters such as the number of threads in the CTA, the location in global memory 320 of an input data set to be processed using the CTA, the location in global memory 320 of the CTA program to be executed, and the location in global memory 320 where output data is to be written. The state parameters may be written to the pushbuffer together with the commands. In response to the commands, core interface 303 loads the state parameters into core 208 (e.g., into parameter memory 308), then begins launching threads until the number of threads specified in the CTA parameters have been launched. In one embodiment, core interface 303 assigns thread IDs sequentially to threads as they are launched. More generally, since all threads in a CTA execute the same program in the same core 208, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

Graphics Pipeline Architecture

Figure 4:
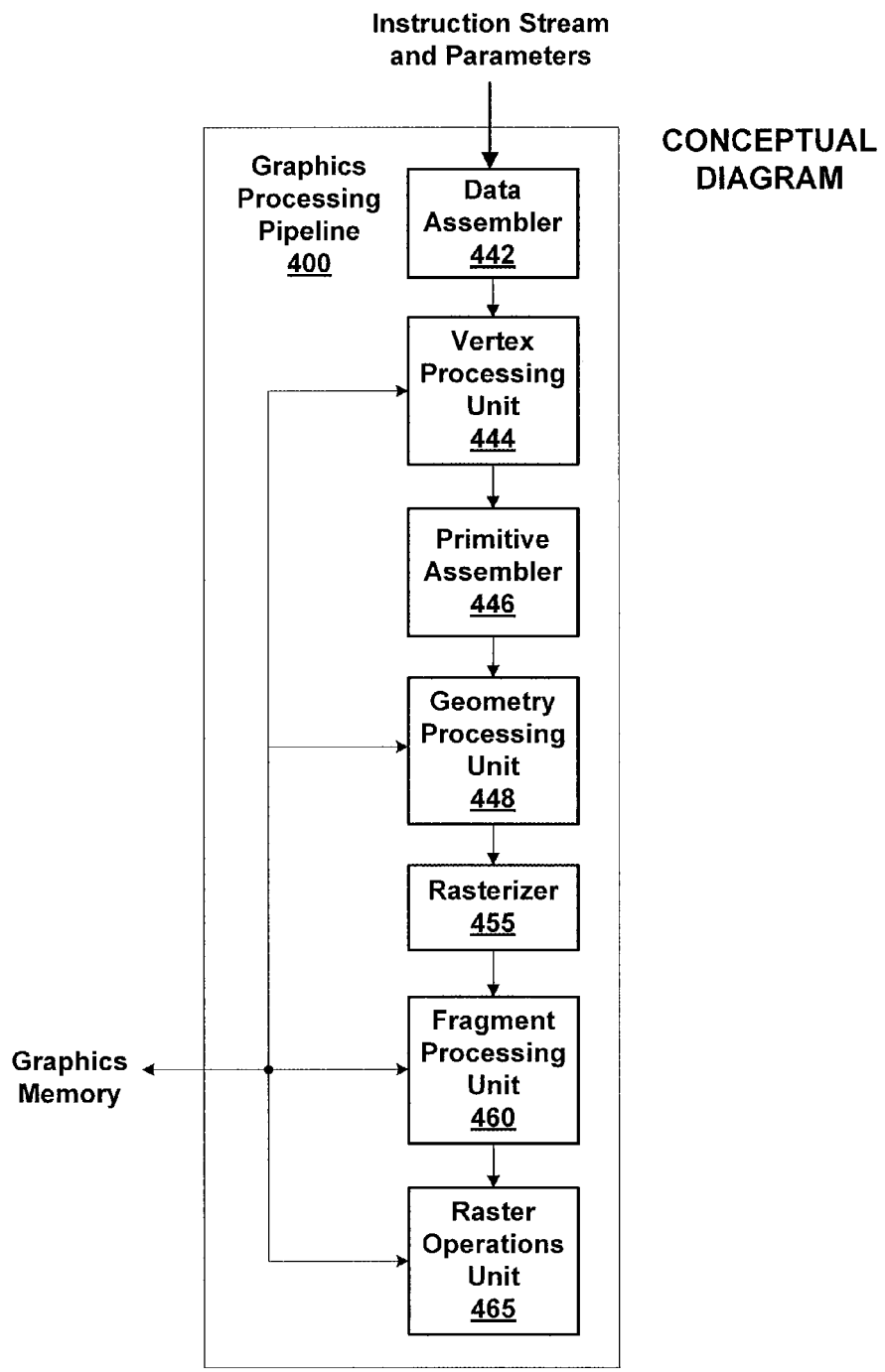
FIG. 4 is a conceptual diagram of a graphics processing pipeline in accordance with one or more aspects of the present invention.

FIG. 4 is a conceptual diagram of a graphics processing pipeline 400, in accordance with one or more aspects of the present invention. PPU 202 may be configured to form a graphics processing pipeline 400. For example core 208 may be configured to perform the functions of a vertex processing unit 444, geometry processing unit 448, and a fragment processing unit 460. The functions of data assembler 442, primitive assembler 446, rasterizer 455, and raster operations unit 465 may also be performed by core 208 or may be performed by host interface 206.

Data assembler 442 is a fixed function unit that collects vertex data for high-order surfaces, primitives, and the like, and outputs the vertex data to vertex processing unit 444. Vertex processing unit 444 is a programmable execution unit that is configured to execute vertex shader programs, transforming vertex data as specified by the vertex shader programs. For example, vertex processing unit 444 may be programmed to transform the vertex data from an object-based coordinate representation (object space) to an alternatively based coordinate system such as world space or normalized device coordinates (NDC) space. Vertex processing unit 444 may read data that is stored in PP memory 204 through memory interface 214 for use in processing the vertex data.

Primitive assembler 446 receives processed vertex data from vertex processing unit 444 and constructs graphics primitives, e.g., points, lines, triangles, or the like, for processing by geometry processing unit 448. Geometry processing unit 448 is a programmable execution unit that is configured to execute geometry shader programs, transforming graphics primitives received from primitive assembler 446 as specified by the geometry shader programs. For example, geometry processing unit 448 may be programmed to subdivide the graphics primitives into one or more new graphics primitives and calculate parameters, such as plane equation coefficients, that are used to rasterize the new graphics primitives. Geometry processing unit 448 outputs the parameters and new graphics primitives to rasterizer 455. Geometry processing unit 448 may read data that is stored in PP memory 204 through memory interface 214 for use in processing the geometry data.

Rasterizer 455 scan converts the new graphics primitives and outputs fragments and coverage data to fragment processing unit 260. Fragment processing unit 460 is a programmable execution unit that is configured to execute fragment shader programs, transforming fragments received from rasterizer 455 as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in PP memory 204 through memory interface 214 for use in processing the fragment data. Memory interface 214 produces read requests for data stored in graphics memory, decompresses any compressed data, and performs texture filtering operations, e.g., bilinear, trilinear, anisotropic, and the like. Raster operations unit 465 is a fixed function unit that optionally performs near and far plane clipping and raster operations, such as stencil, z test, and the like, and outputs pixel data as processed graphics data for storage in graphics memory. The processed graphics data may be stored in graphics memory for display on display device 110.

In a conventional system, in order to switch contexts, each processing unit a graphics processing pipeline is idled and a new context is loaded. Alternatively, if the current context would take too long to execute and reach an idle point, an active context switch may be performed by unloading the active context and loading the new context. Since the active context state is larger than the idle context state, time needed to switch contexts is longer, but it isn't necessary to reach an idle point. In either case, the number of clock cycles needed to perform the context switch negatively impacts the interactivity of an application program that uses the graphics processing capability.

In contrast, core 208 is capable to processing more than a single context simultaneously. Specifically, for each graphics processing unit, e.g., data assembler 442, vertex processing unit 444, primitive assembler 446, geometry processing unit 448, rasterizer 455, fragment processing unit 460, and raster operations unit 465, core 208 may be configured to process more than a single context by maintaining an active context for more than one context. However, since the active context can be quite large, each processing unit may process a disparate number of contexts simultaneously.

Multiple Simultaneous Contexts

Figure 5A:
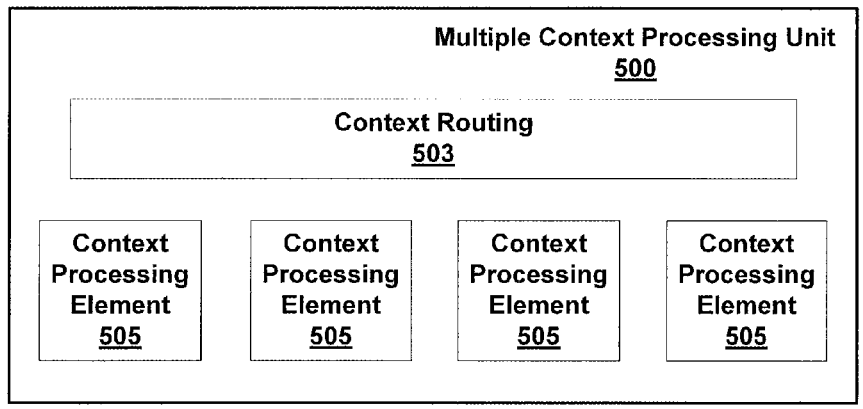
FIGS. 5A, 5B, and 5C are block diagrams of the multiple context processing units in accordance with one or more aspects of the present invention.

FIG. 5A is a block diagram of a multiple context processing unit 500, in accordance with one or more aspects of the present invention. Multiple context processing unit 500 corresponds to a core 208 and a context processing element 505 corresponds to a processing engine 302. Multiple context processing unit 500 simultaneously processes four contexts when each context processing element 505 is allocated to process one of the multiple contexts. In other embodiments of the present invention, additional context processing elements 505 may be included in multiple context processing unit 500 to process additional contexts simultaneously. For example, when N contexts are supported, N context processing elements 505 within each context processing unit 500 are allocated to process one of the N contexts. Alternatively, each context processing element 505 is configured to maintain active context for more than one context. For example, when N contexts are supported, each of M context processing elements 505 supports at least ceiling (N/M) sets of state, so that N contexts can be evenly distributed across the M context processing elements 505.

Context routing 503 is used to route program instructions and input data for a particular context to the context processing element 505 that is allocated to process the particular context. When multiple context processing units 500 are configured in a pipeline that includes stages of multiple context processing unit 500 with equal number of context processing elements 505, each context processing element 505 may output program instructions and data directly to another context processing element 505 and context routing 503 may be omitted.

Figure 5B:
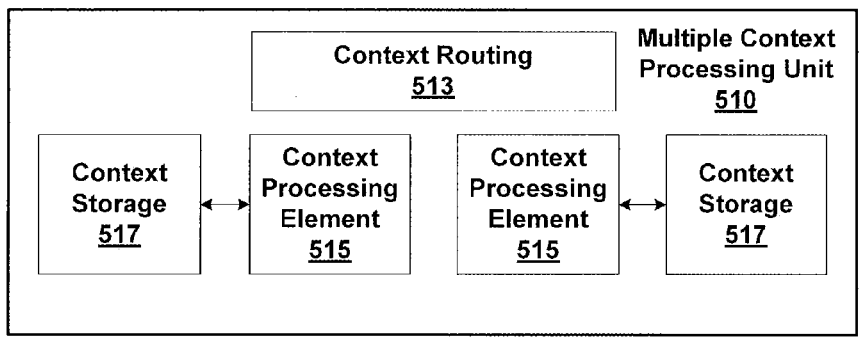

FIG. 5B is a block diagram of a multiple context processing unit 510, in accordance with one or more aspects of the present invention. Multiple context processing unit 510 corresponds to a core 208 and a context processing element 515 corresponds to a processing engine 302. Multiple context processing unit 510 simultaneously processes one one, two or more contexts when each context processing element 515 is allocated to process one or more of the multiple contexts. Each context processing element 515 may be configured to maintain active context for more than one context by storing the active context state for additional contexts in context storage (memory) 517.

In contrast, context processing elements 505 maintain one or more active contexts within each context processing element 505. Therefore, context processing elements 505 require more storage circuitry at each pipeline state and are therefore larger in terms of die area compared with context processing elements 515. The advantage of context processing elements 505 is that context switches can be performed quickly, even in a single clock cycle.

Context processing element 515 performs a context switch by unloading the active context state to context storage 517 and loading the new context state from context storage 517. Each context processing element 515 has a dedicated context storage 517 and the number of clock cycles needed to unload and load context state to/from a context processing element 515 depends on the amount of active state that is maintained within the context processing element 515 and the interface bandwidth between context processing element 515 and context storage 517.

Context routing 513 is used to route program instructions and input data for a particular context to the context processing element 515 that is allocated to process the particular context. When multiple context processing units 510 are configured in a pipeline, each context processing element 515 may output program instructions and data directly to another context processing element 515 and context routing 513 may be omitted.

Figure 5C:
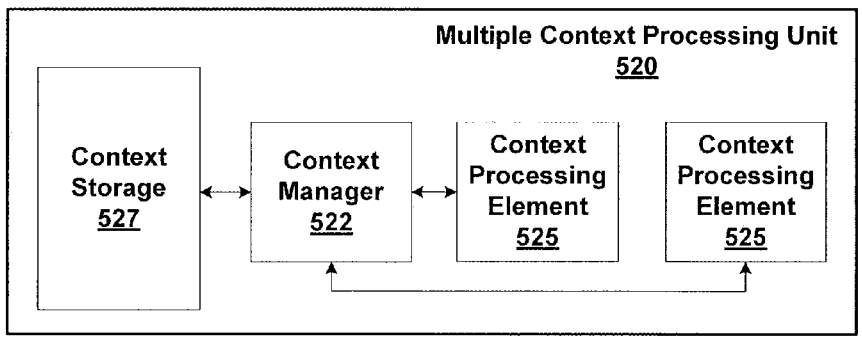

FIG. 5C is a block diagram of a multiple context processing unit 520, in accordance with one or more aspects of the present invention. Multiple context processing unit 520 corresponds to a core 208 and a context processing element 525 corresponds to a processing engine 302. Multiple context processing unit 520 simultaneously processes two or more contexts when each context processing element 525 is allocated to process one or more of the multiple contexts. Each context processing element 525 may be configured to maintain active context for more than one context by storing the active context state for the multiple contexts in a single shared storage resource, context storage 527. Since context storage 527 is shared between the context processing elements 515 the size of context storage 527 may be smaller than the combined size of dedicated context storages 517. A context manager 522 performs context unloading and loading tasks to switch between the multiple contexts based on the commands that are received by multiple context processing unit 520.

In some embodiments of the present invention each context processing element 505, 515, or 525 is constrained to access particular memory devices of graphics memory. This constraint is advantageous in terms of minimizing access latency and wiring for the available memory bandwidth, but reduces the flexibility for allocating context processing elements 505, 515, or 525 to process any of the multiple contexts. For example, when a context processing element 505, 515, or 525 configured to perform the functions of raster operations unit 465, each context processing element 505, 515, or 525 is coupled to a particular portion of the memory interface to facilitate high bandwidth read and write transfers to/from graphics memory. However, each context may need to access any portion of the graphics memory. Therefore, each context processing element 505, 515, or 525 needs to store all N multiple contexts.

In other embodiments of the present invention, other special resources can impose similar constraints on the allocation of context processing elements 505, 515, or 525 to process any of the multiple contexts. In either case, each context processing elements 505, 515, or 525 can each be configured to process all N multiple contexts in order to provide processing throughput for contexts that are mapped to a particular portion of graphics memory. Alternatively, a particular portion of memory needed by a context may be moved in graphics memory to correspond to the context processing element 505, 515, or 525 that is allocated to the context.

When an embodiment of the present invention allows for the portions of memory to be changed, it is possible to limit the number of contexts that each context processing element 505, 515, or 525 is configured to process and process the multiple contexts simultaneously. For example, when each context processing element 505, 515, or 525 is configured to process up to two contexts, a first context is mapped to 8 context processing elements 505, 515, or 525, a second context is mapped to 4 of the 8 context processing elements 505, 515, or 525, a third context is mapped to 2 of the remaining 4 of the 8 context processing elements 505, 515, or 525, and a fourth context is mapped to the remaining 2 of the 8 context processing elements 505, 515, or 525. Therefore, five contexts are processed in parallel when each one of context processing elements 505, 515, or 525 is configured to only support up to two contexts.

Figure 6:
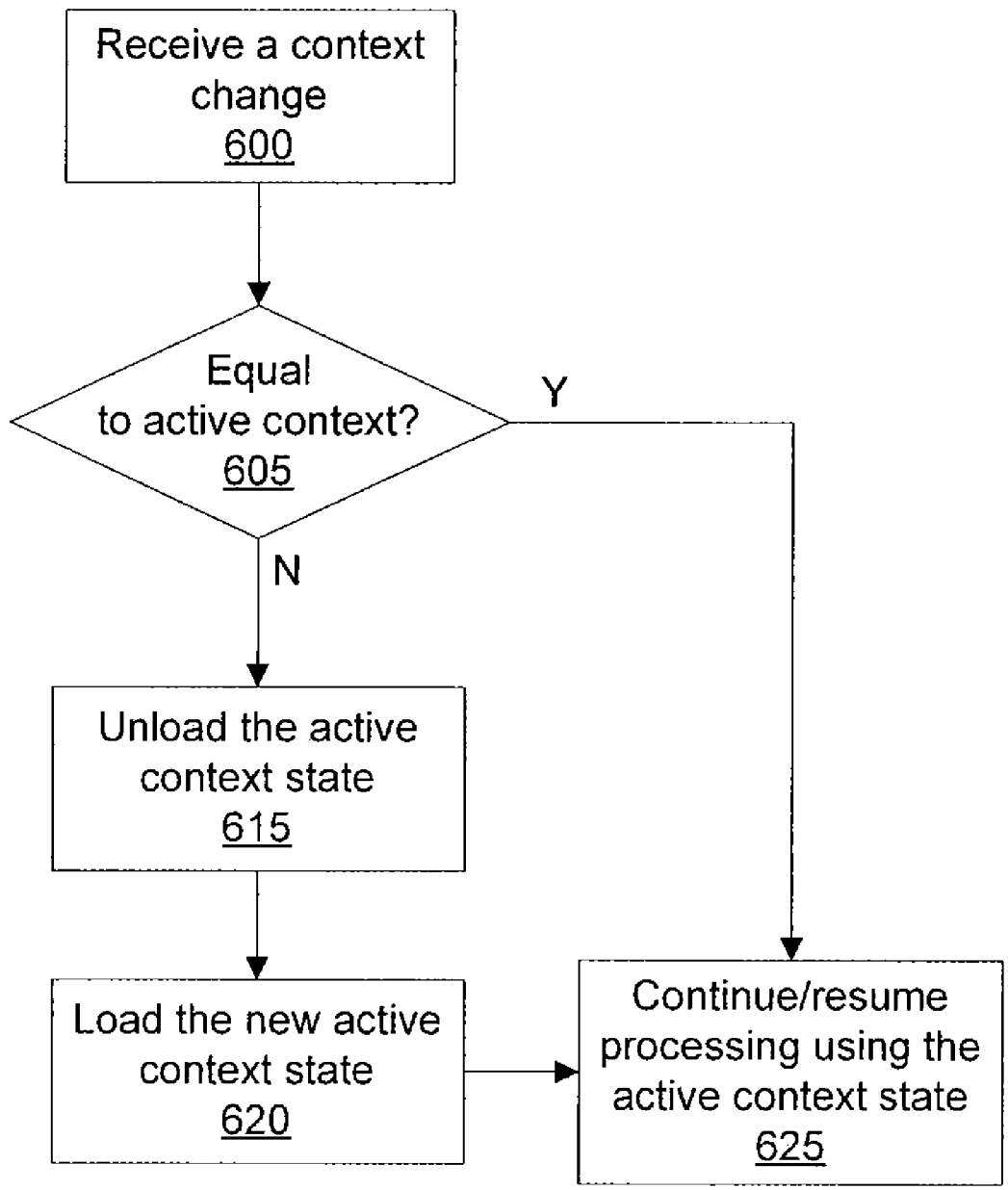
FIG. 6 is a flow diagram of method steps for switching active contexts in accordance with one or more aspects of the present invention.

FIG. 6 is a flow diagram of method steps for switching active contexts, in accordance with one or more aspects of the present invention. Although the method is described in the context of multiple context processing unit 520, this method may be used by multiple context processing units 500, 510, and 520. In step 600 multiple context processing unit 520 receives a context change. In some embodiments of the present invention, a context identifier is provided to multiple context processing unit 520 with the instructions and data. In other embodiments of the present invention, a context switch instruction is used to change the context that is used to process the data.

In step 605 multiple context processing unit 520 determines if the new context is an active context, meaning that multiple context processing unit 520 is already configured to process data for the new context without needing to unload and load a context. Since each context processing element 525 may be configured to process a different context, the new context may be an active context in at least one context processing element 525.

If, in step 605 multiple context processing unit 520 determines that the new context is an active context, then multiple context processing unit 520 proceeds directly to step 626 and continue processing received data using the active context. If, in step 605 multiple context processing unit 520 determines that the new context is not an active context, then in step 615 multiple context processing unit 520 unloads the active context state from one or more processing elements 525, depending on which multiple context processing unit 520 is allocated to process the new context. The active context state is stored in context storage 527. In some embodiments of the present invention, particularly those embodiments in which context processing element 525 is not a deep pipeline, context processing element 525 is drained or partially drained to minimize the amount of active context state that is unloaded.

In step 620 multiple context processing unit 520 loads the new context state from context storage 527 into the one or more context processing elements 525 that are allocated to process the new context. In step 625 multiple context processing unit 520 continues processing data using the (new) active state.

Dynamic Load Balancing of Multiple Contexts

In some embodiments of the present invention, multiple context processing units 500, 510, and 520 are configured to switch contexts when the active context is blocked, i.e., cannot proceed with processing data. The active context may be blocked due to a resource contention or while waiting for completion of a memory read request, such as a texture map read. In some cases during graphics processing it is possible to saturate the processing throughput of one processing engine (such as a core 208 or host interface 206 configured to perform the functions of data assembler 442, vertex processing unit 444, primitive assembler 446, geometry processing unit 448, rasterizer 455, fragment processing unit 460, raster operations unit 465 of FIG. 4) and have another processing engine operate below capacity. For example, depending on the graphics primitives being rendered for a context, a setup engine (primitive assembler 446) generates plane equations which saturate the capacity of a downstream fragment processing unit 460. At a later point in time, during processing of the same context, the setup engine may be saturated while the downstream fragment processing unit 460 is underutilized.

Conventionally, a context executes until a program is completed, avoiding any need to perform a context switch. In order to optimize processing throughput, multiple context processing unit 505, 515, or 525 may use a virtual channel technique to context switch to a new context when the active context is blocked and unable to execute, thereby increasing processing throughput. The concept of virtual channel is known to those skilled in the art of ATM (asynchronous transfer mode) networking, and is used to improve processing throughput for a device that accepts requests from multiple sources. If a request becomes blocked so that the device cannot immediately complete the associated transaction, the device waits idle and the other sources wait idle, even though they might be able to be processed. In networking, virtual channels allows one of the other sources to be bypass the blocked source and be processed.

When the virtual channel technique is used in the present invention, an underutilized setup engine can context switch to a different context, preferably a context that is setup performance limited rather than fragment processing limited, while the fragment processing engine is saturated. Switching between two different contexts using the virtual channel technique improves overall processing throughput. Virtual channels can be used without or without allocations of processing elements to contexts.

The ability to simultaneously process multiple contexts increases processing throughput by distributing processing between different contexts. For example, when a graphics processor, such as parallel processing subsystem 112 of FIG. 1 configured for processing graphics data, runs most efficiently with 30,000 parallel threads during a single clock cycle, multiple contexts can be processed in parallel to achieve greater processing throughput compared with running a single context. Specifically, if a first context requires only 15,000 threads, the full processing throughput of parallel processing subsystem 112 is achieved by also processing a second context that uses the remaining 15,000 threads each clock cycle. The processing throughput for each context is doubled since 30,000 threads are executed each clock cycle for each context instead of 15,000 threads each clock cycle when the contexts are processed serially.

Furthermore, supporting simultaneously processing of multiple contexts is needed when a context requires a long time to execute. In particular, if the context requires a long time to execute, an operating system may conclude that parallel processing subsystem 112 is idle and initiate a sleep or power saving mode and disable the power supply to parallel processing subsystem 112. In some cases, the operating system may determine that an unrecoverable error has occurred when a context requires too long to execute on parallel processing subsystem 112. Allocating a small portion of the processing throughput to process a second context can eliminate problems caused by a single context running for too long. For some applications the allocation of processing throughput to contexts is static, having been determined by the application developer. In some embodiments of the invention, particularly console systems, device driver 101 is omitted and the static allocation is used. Other applications benefit from dynamic load balancing, relying on device driver 101 to monitor and change the allocations for each context to improve processing throughput. In some embodiments of the present invention, the monitoring of processing throughput and allocation adjustment is performed within parallel processing subsystem 112.

Figure 7:
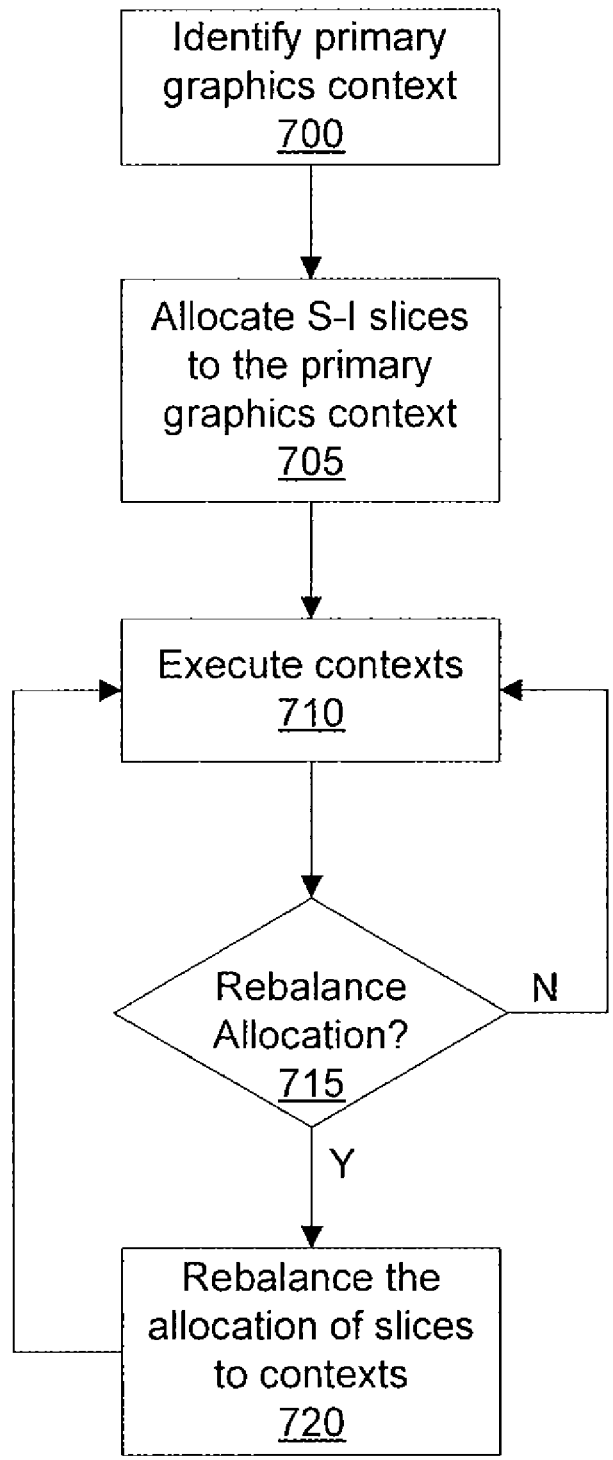
FIG. 7 is a flow diagram of method steps for performing dynamic load balancing of multiple contexts in accordance with one or more aspects of the present invention.

FIG. 7 is a flow diagram of method steps for performing dynamic load balancing of multiple contexts, in accordance with one or more aspects of the present invention. In step 700 a primary graphics context is identified. The primary graphics context may be the graphics processing context that requires the greatest processing throughput or has a highest execution priority. For example, a real time application has priority over a non-real time application. In step 705 processing slices are allocated to the primary graphics processing context. Each processing slice represents the smallest processing unit, such as an entire context processing element 505, 515, or 525, or a portion of context processing element 505, 515, or 525 when those elements are configured to process multiple contexts simultaneously. A minimum allocation, i, of the processing slices that can be as small as a single processing slice is not allocated to the primary graphics context. Therefore, in step 705, the primary graphics processing context is allocated S-i slices and the other processing contexts are share the remaining i slices, where S is the total number of processing slices and each of the remaining J contexts is allocated i/J processing slices.

In step 710 the contexts are executed for a number of clock cycles over which time performance data is measured to determine the number of clock cycles that each context is blocked from execution, including the clock cycles when another context was executing using a shared processing slice. In step 715 device driver 101 or parallel processing subsystem 112 determines if the processing slice allocation needs to be rebalanced based on the performance data. For example, when one context is blocked by a specified amount more than a context with the least number of blocked clock cycles, the slice allocation needs to be rebalanced. Other methods for determining when rebalancing is needed may also be employed.

If, in step 715 the method determines that rebalancing is not needed, then the method returns to step 710 and the contexts are executed with the current slice allocation. Otherwise, in step 720 the context with the greatest number of blocked clock cycles is allocated an additional processing slice and the context with the least number of blocked clock cycles is allocated one less processing slice. The method then returns to step 710 and the contexts are executed with the rebalanced slice allocation. Steps 710, 715, and 720 are repeated to dynamically allocate the processing slices in order to improve the processing throughput of parallel processing subsystem 112.

Multiple context processing units 500, 510, and 520 within a parallel processing subsystem 112 are capable of processing multiple contexts simultaneously, reducing the need to perform time consuming context switches compared with processing a single context at a time. Context processing elements 505, 515, and 525 may be configured to perform the functions of graphics processing pipeline 400 and support all of the multiple contexts or only a portion of the multiple contexts. Each context processing element 505, 515, and 525 may be allocated to process a particular context or a portion of the multiple contexts in order to simultaneously process more than one context. The allocation of processing elements to the multiple contexts may be determined dynamically in order to improve graphics processing throughput.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

The invention claimed is:

1. A method for simultaneously processing multiple contexts, comprising:
    allocating each of a plurality of contexts defined by one or more application programs to one or more context processing elements, wherein a context processing element is configured to support the execution of a plurality of concurrent threads associated with each context to which the context processing element has been allocated;

configuring a first context processing element of the context processing elements to process a first set of contexts included in the plurality of contexts based on the processing allocation;

configuring a second context processing element of the context processing elements to process a second set of contexts included in the plurality of contexts based on the processing allocation; and processing data for two or more of the plurality of contexts simultaneously within the first context processing element and the second context processing element to produce processed data for the first set of contexts and the second set of contexts.

2. The method of claim 1, further comprising the steps of:
identifying a primary graphics context from the plurality of contexts; and
allocating the primary graphics context to a set of context processing elements including the second context processing element.

3. The method of claim 1, further comprising the steps of:
monitoring the processing of the data to produce performance information including a blocked cycle count for each one of the plurality of contexts; and
rebalancing the processing allocation based on the performance information.

4. The method of claim 1, wherein one context in the first set of contexts is not included in the second set of contexts.

5. The method of claim 1, wherein each one of the context processing elements is configured to process a maximum number of contexts that is less than all of the plurality of contexts.

6. The method of claim 1, further comprising the steps of:
determining that processing of a first context in the first set of contexts is blocked; and
processing a second context in the first set of contexts while the first context is blocked.

7. The method of claim 1, wherein the number of context processing elements equals the number of the plurality of contexts and the processing allocation allocates a different one of the plurality of context to each context processing element.

8. The method of claim 1, wherein N context processing elements are included in the context processing elements and M contexts are included in the plurality of contexts, and the processing allocation allocates each one of the M contexts to N/M of the context processing elements.

9. The method of claim 1, further comprising the steps of:
unloading context state for a first context in the first set of contexts;
storing the context state for the first context; and
loading context state for a second context in the first set of contexts to switch from processing the first context to processing the second context in the first context processing element.

10. The method of claim 1, wherein each of the plurality of contexts is associated with a graphics program configured to process graphics data.

11. A system for simultaneously processing multiple contexts, comprising:
a parallel processing unit configured to simultaneously process a plurality of contexts defined by one or more application programs using a processing allocation that specifies one or more context processing elements that are dedicated to process each one of the plurality of contexts, wherein each of the context processing elements is configured to support the execution of a plurality of concurrent threads associated with each context to which the context processing element has been allocated, the parallel processing unit including:
a work distribution unit configured to receive instructions and data for the plurality of contexts and distribute the instructions and data to plurality of context processing elements according to the processing allocation;
a first context processing element configured to process a first set of contexts included in the plurality of contexts based on the processing allocation to produce processed data for the first set of contexts; and
a second context processing element to simultaneously process a second set of contexts included in the plurality of contexts based on the processing allocation to produce processed data for the second set of contexts.

12. The system of claim 11, further comprising a device driver configured to identify a primary graphics context included in the plurality of contexts and allocate the primary graphics context to a set of context processing elements including the first portion of the context processing elements that includes the second context processing element to process the primary graphics context.

13. The system of claim 11, wherein the parallel processing unit is further configured to monitor the processing of the data to produce performance data that includes a blocked cycle count for each one of the plurality of contexts and rebalance the processing allocation based on the performance data.

14. The system of claim 11, wherein one context in the first set of contexts is not included in the second set of contexts.

15. The system of claim 11, wherein processing allocation is static.

16. The system of claim 11, wherein the first context processing element is further configured to process a second context in the first set of contexts when the first context is blocked.

17. The system of claim 11, further comprising context routing configured to deliver data or instructions for a first set of contexts to the first context processing element.

18. The system of claim 11, wherein N context processing elements are included in the context processing elements and M contexts are included in the plurality of contexts, and the processing allocation allocates each one of the M contexts to N/M of the context processing elements.

19. The system of claim 11, further comprising:
a context storage configured to store a context state for a first context in the first set of contexts and a context state for a second context in the first set of contexts; and
a context manager coupled to the first context processing element and configured to unload the context state for the first context from the first context processing element and output the context state for the second context to switch from processing the first context to processing the second context in the first context processing element.

20. The system of claim 11, wherein the each one of the plurality of context processing elements is configured to process a maximum number of contexts that is less than all of the plurality of contexts.

* * * * *